ســ

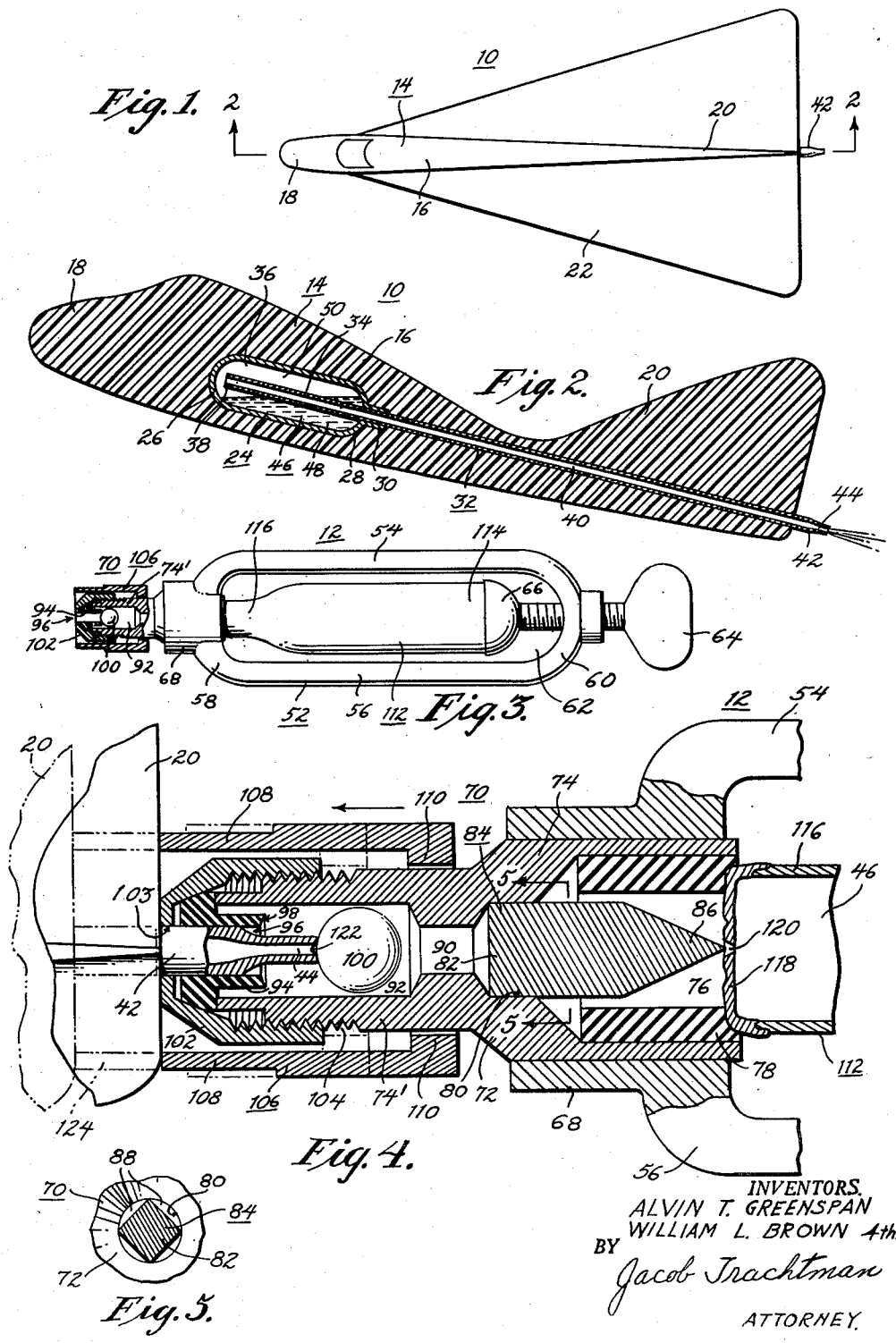

United States Patent Office 2,943,417
Patented July 5, 1960

2,943,417

JET PROPULSION DEVICE

Alvin T. Greenspan, 1614 Middleton St., Philadelphia 38, Pa., and William L. Brown 4th, Pine Grove Mills, Pa.

Filed Apr. 16, 1956, Ser. No. 578,383

5 Claims. (Cl. 46—76)

The invention relates to a jet propulsion device, and more particularly to a model aircraft of the jet propulsion type.

Heretofore, jet propulsion devices for model aircraft have used a combustible fluid or solid cartridge, have been of the inflatable type, or have carried a cartridge of a volatile fluid for the purpose of producing a jet reaction. The latter type has required the replacement of the cartridge after each flight, and has been found practical only for propulsion devices which are not to be retrieved or used for a succession of flights of short duration.

It is therefore a primary object of the invention to provide a new and improved jet propulsion device which is self contained and can easily be recharged for producing a jet reaction.

Another object of the invention is to provide a new and improved jet propulsion device which is especially adapted for use in a model aircraft.

Another object of the invention is to provide a new and improved jet propulsion device which does not require the attachment of a container of volatile fluid for each jet reaction to be produced.

Another object of the invention is to provide a new and improved jet propulsion device of simple construction and high efficiency in converting a volatile liquid into a gaseous state for producing a jet reaction.

Another object of the invention is to provide a new and improved model aircraft which can be successively recharged by use of a main source of supply without the removal and addition of cartridges to the aircraft.

Another object of the invention is to provide a new and improved jet propulsion aircraft which may have its tank charged through its jet discharge tube.

Another object of the invention is to provide a new and improved charging means for a model jet aircraft controllably supplying a charge on numerous occasions from the same supply source.

Another object of the invention is to provide a new and improved charging device adapted to receive a standard high pressure bottle and dispensing its contents in controlled amounts to the tank of a model jet aircraft through its jet discharge tube.

Another object of the invention is to provide a new and improved fluid charging means for a model jet aircraft including launching means.

Another object of the invention is to provide new and improved jet propulsion aircraft of the model type with charging means for affording great amusement, while being relatively inexpensive to operate, maintain and manufacture.

Another object of the invention is to provide a new and improved jet propulsion device and charging means allowing the use of a standard type charging bottle of high capacity over an extended period of time by dispensing small quantities of the fluid under pressure from the bottle as required from time to time.

The above objects as well as many other objects of the invention are achieved by providing a jet propulsion unit comprising a tank body having a front end, and rear end and a cavity of constant volume adapted to receive a fluid charge of a volatile liquid under pressure, and a charging and discharging tube having a forward portion entering the cavity of said body at its rear end and extending within the cavity to a position proximate the front end of the body. The tube is provided with a metering orifice for discharging at a controlled rate the gaseous phase of the fluid of the cavity to produce a jet reaction.

A charging and launching device for the jet propelled unit comprises a frame, a supply tank received in the frame having a cavity of constant volume containing a volatile liquid under pressure and a dispensing outlet, and a control valve supported by the frame for dispensing the fluid of the supply tank. The control valve of the charging device is normally closed by the fluid pressure of the supply tank. The control valve is opened by the receipt of the end of the discharge tube of the jet propelled unit for charging the tank body of the unit with the volatile liquid under pressure from the supply tank. The volume of the supply tank of the charging device exceeds the volume of the tank body of the propelled unit, so that the tank unit may receive a plurality of successive charges from time to time as required before exhausting the fluid in the supply tank.

With the foregoing in mind, this invention will be most readily understood from the following detailed description of a representative embodiment thereof, reference for this purpose being had from the drawings in which:

Figure 1 is a plan view of a model aircraft embodying the invention,

Figure 2 is a sectional view taken on the line 2—2 of Figure 1 showing the aircraft in an ascending flight position, Figure 3 is a plan view of the charging and launching device of the invention, with the valve portion broken away, and Figure 4 is an enlarged fragmentary view with portions broken away of the valve portion of the charging and launching device in engagement with the jet tube of the propelled unit, and Figure 5 is a sectional fragmentary view on line 5—5 of Figure 4.

Like numerals designate like parts throughout the several views.

Refer now to the figures which illustrate the jet propulsion device in the form of a model aircraft 10, and an aircraft charging and launching device 12.

The model aircraft 10 comprises a main unit 14 with a central portion 16, a nose portion 18 and a tail portion 20. The unit 14 may be made of plastic, wood, or metal material of solid or frame construction or other suitable material and construction. As illustrated the unit 14 is made of a molded plastic material of light weight and includes a molded wing portion 22 of delta shape as an integral part and may be of any other suitable form.

The main unit 14 of the model aircraft 10 is provided with a tank body 24 which has a front end 26 and a rear end 28. The rear end of tank body 24 is provided with a neck 30 having a threaded opening which receives a charging and discharging tube 32.

The tube 32 has a forward portion 34 which is received within the cavity 36 of the tank body 24. The end 38 of the tube is positioned proximate to the front end or portion 26 of the tank body 24. The rear portion 40 of the tube 32 passes rearwardly through the tail portion 20 of the main unit 14 and has an extending end 42 providing a restricted metering orifice 44. The tank body 24 and the tube 32 are positioned in the main unit 14 of the aircraft 10 to provide the proper aerodynamic center of gravity for ascending flight during jet action and for gliding in the absence of the jet propelling force. This of course should take into account the weight of the volatile fluid 46 which is received within the cavity 36 of the tank body 28. The fluid 46 has a fluid phase 48 and a gaseous phase 50.

The charging and launching device 12 shown in Figure 3 comprises a frame 52 having side members 54 and 56 which are joined at their front end 58 and rear end 60, forming an elongated open space 62 between them. The rear end 60 of the frame 52 is provided with an opening threadedly receiving a clamp screw element 64 having a hemispherical bottle retaining element 66 at its screw end.

The front end 58 of the frame 52 is provided with a valve supporting portion 68 which has an opening for receiving a valve assembly 70.

The valve assembly 70 is shown in detail in Figure 4 and comprises a substantially tubular body 72 which has an enlarged end 74 and an extending portion 74' of reduced diameter. The end 74 of the tubular body 72 is secured within the opening of the retaining portion 68 of the frame 52 by press fit or similar means. The valve body 72 is provided with an inlet chamber 76 within its enlarged end 74. A sealing washer 78 may be made of a rubber material and secured within the inlet chamber 76. A circular throat 80 is formed in the enlarged portion 74 of the valve body 72. The throat 80 receives and retains the square base portion 82 of a piercing element 84. The piercing element 84 has a pointed end 86 extending into the chamber 76 in the direction aligned with the clamping screw 64.

The inlet orifice 76 communicates through the openings 88 and the passage 90 with a valve chamber 92 in the valve portion 74' of the body 72.

The chamber 92 is restricted at its outlet end by a valve seat element 94 having a central opening 96 which communicates externally. A ball engaging surface or seat 98 is provided surrounding the opening 96 in the seat element 94. A valve ball 100 is positioned within the valve chamber 92 and is adapted to seal the opening 96 in the valve seat element 94 when engaging its seat surface 98. The valve seat element 94 is positioned and retained by an adjusting nut 102 which threadably engages the outer surface 104 of the portion 74' of the valve body 72. The nut 102 has a central opening 103 in alignment with the opening 96 of the seat element 94, and by tightening reduces the opening 96.

The adjusting nut 102 also retains an aircraft launching element 106 which is slidably received on the portion 74' of the valve body 72 between its enlarged portion 74 and the adjusting nut 102. The launching element 106 is a substantially cylindrical body providing a rim portion 108 with an annular inwardly directed flange portion 110.

The frame 52 receives within its space 62 a supply bottle 112 of standard construction containing a volatile fluid 46 under pressure. The rear end 114 of the bottle is received in the hemispherical element 66 of the clamp screw 64, while its neck 116 engages the washer 78 of the valve assembly 70. In operation, the supply bottle 112 which contains a highly volatile fluid such as carbon dioxide is positioned in the frame 52 as described. The clamp screw 64 is then tightened. This causes the end 116 to compress the washer 78 and form a good fluid seal. With further clamping action, the pointed end 86 of the piercing element 84 punctures the sealed portion 118 of the supply bottle 112 forming a dispensing opening 120. The clamping screw 64 may be released to a small degree to remove the pointed end 86 of the piercing element 84 from the opening 120 allowing the fluid 46 to flow into the inlet chamber 76 of the valve assembly 70 while still maintaining its seal with the washer 78.

The pointed end 86 of the piercing element 84 may be horizontally notched to eliminate the necessity of retracting the supply bottle 112 after it is pierced. The fluid 46 under pressure passes around the square base portion 82 through the openings 88 (see Figure 5) and the passage 90 into the valve chamber 92. The fluid under pressure forces the ball 100 to firmly engage the seat surface 98 of the seat element 94, thereby restricting the passage 96. The valve assembly 70 is thus placed in its closed condition preventing the discharge of the fluid 46. The Figure 3 shows the valve assembly 70 in its closed condition.

When the aircraft 10 is to receive a charge, the extending portion 42 of its jet discharge tube 32 is received into the opening 96. The outer diameter of the tube 32 is dimensioned to closely fit the opening 96. When thus received, the end 42 of the tube 32 displaces the valve ball 100 from its seat surface 98 and allows the fluid 46 in the valve chamber 92 to enter the tube 32. The end 42 may be nicked as at 122 so that a seal is not formed with the ball 100, thereby allowing the fluid 46 to readily enter the tube 32.

The fluid 46 under pressure is delivered by the tube 32 to the tank body 24 until a pressure equilibrium is established between the fluid in the tank body 24 and the fluid in the supply bottle 112.

Under these conditions of equilibrium, the tank body 24 will have received the maximum possible charge, placing the aircraft 10 in condition for launching.

When the aircraft 10 is being charged, its tail portion 20 causes the launching member 106 to assume its retracted position shown in Figure 4. In order to launch the aircraft 10, the element 106 is thrust forward to its extended terminal position which is shown by the dashed lines at 124. This imparts a forward momentum to the aircraft 10 causing the extended portion 42 of its tube 32 to be withdrawn from the valve assembly 70 thus conditioning it for flight. Of course, the charging and launching device 12 may be oriented in the position desired for directing the aircraft 10 before the launching element 106 is thrust forward. With the removal of the extending portion 42 of the tube 32 of the aircraft 10 from the valve assembly 70, the flow of fluid around the ball 100 causes it to engage the seating surface 98 of the element 94 closing the valve. This prevents the further discharge of the the fluid 46.

Thus, the charging and launching device 12 may utilize a supply bottle 112 having a capacity greater than the volume of the tank body 24 of the aircraft 10 for supplying numerous successive charges to the aircraft 10 before its supply is exhausted.

The controlled dispensing is a great advantage, since the supply bottles 112 are available in a standard minimum size with a content exceeding the amount which is to be utilized at one time. Since the total charge of the bottle 112 is much greater than can be utilized at one time, most of the contents of the bottle 112 would otherwise be wasted. This would be too wasteful and costly for practical utilization. When the contents of the supply bottle 110 is exhausted, it may be readily replaced by another sealed bottle 112 and instantly placed in condition for dispensing its fluid.

When the aircraft 10 is launched, the fluid 46 in the chamber 36 of the tank body 24 is at a pressure greatly exceeding the external atmospheric pressure. The fluid 46 which is highly volatile forms a liquid phase 48 and a gaseous phase 50. A fluid having the desired properties such as liquid carbon dioxide may be supplied by the bottle 112 or any other similar satisfactory fluid.

The pressure differential between the fluid 46 and the atmosphere, causes the fluid to be discharged through the tube 32 and exhausted at its end 42 through the orifice 44 into the atmosphere. The metering orifice 44 provides a desired restriction in the tube 32 controlling the rate of flow of the fluid 46. The fluid flow produces a jet reaction causing motion of the aircraft 10 in the forward direction.

It is noted, that by the arrangement of the forward portion 34 of the tube 32 which has its end 38 extending proximate the front portion 26 of the tank 28, it is within the gaseous phase 50 of the fluid 46 in the tank body 24. Of course, the end 38 of the tube 32 may be directed upwardly to further assure the discharge of the fluid 46 in its gaseous state.

As the gaseous phase 50 of the carbon dioxide fluid 46 is exhausted in the form of a jet, it is continuously replenished by the evaporation of the liquid phase 48. This allows the continuous production over an extended period of time of the carbon dioxide in its gaseous phase 50 which is utilized to produce the jet flow. At a temperature of approximately 70° Fahrenheit, the carbon dioxide fluid 46 produces a pressure within the cavity 36 of approximately 1000 pounds per square inch. The position of the end 38 of the tube 32 allows the gaseous phase 50 rather than the liquid phase 48 of the fluid 46 to be dispensed. This permits the efficient operation of the propelling means of the aircraft 10. When the liquid phase 48 of the fluid 46 is exhausted, the production of the gaseous phase 50 is terminated. This terminates the jet flow from the aircraft 10 and the jet reaction produced thereby. The Figure 2 particularly illustrates the attitude of the aircraft 10 in flight under action of the jet. This causes the nose 18 to rise further assuring that the end 38 of the tube 32 is within the gaseous phase 50 within the tank body 28. When the fluid 46 is exhausted the aircraft 10 may then assume a glide or soaring inclination further perpetuating its flight.

The volume of the tank body 24 of course can be varied for the purpose of determining the duration of the flight of the aircraft 10 by jet reaction.

It has been found that a jet tank 24 with a volume of approximately 0.16 cubic inch will produce a flight of about five seconds. In such case, the tank 24 was proportioned with a wall thickness of .062 inch and a one-half inch outside diameter. The tube 32 was provided with an outside diameter of approximately .062 inch and a metering orifice with a .010 inch opening. Of course, these dimensions can be varied to suit the particular design circumstances.

In this connection, it is noted that a standard size container bottle 112 containing liquid carbon dioxide at approximately 1000 pounds per square inch at 70° F. has a volume of approximately 1 cubic inch or five times that of the tank body 24 above illustrated. Under such circumstances, the aircraft 10 may be charged approximately five successive times before the supply of carbon dioxide liquid is exhausted. Each of the flights, which have been achieved under such circumstances, has been over a distance of approximately 125 yards.

The jet propulsion device illustrated including the aircraft 10 and launching means 12 when used in model form for amusement purposes, has afforded great satisfaction and amusement. The repeated use of supply bottle 112 to provide a plurality of charges and flights, has been found efficient and relatively inexpensive for the amusement afforded.

Of course, the jet propulsion device may be used for many purposes such as for delivery of material or messages from one point to another, especially when a guide means such as a wire is incorporated, as well as many other such adaptations.

It will, of course, be understood that this description and drawings, including the various dimensions specified herein, are illustrative merely, and that various modifications and changes may be made in the structures disclosed without departing from the spirit of the invention.

What is claimed is:

1. A jet propulsion apparatus comprising a model aircraft unit with a tank body having a front end, a rear end, a cavity of constant volume adapted to receive a fluid charge of carbon dioxide in its liquid state under pressure, and a charging and discharging tube secured with and providing sole communication with the cavity of said body by having a forward portion entering the cavity of said body at its rear end and a tail portion extending a predetermined length in the rearward direction of said aircraft for engaging the control valve of a charging device and having a metering orifice for discharging at a controlled rate the gaseous phase of said fluid of said cavity to produce a forward jet reaction; and an aircraft charging and launching device comprising a frame, a supply tank received in said frame having a cavity of constant volume containing liquid carbon dioxide under pressure and a dispensing outlet, a control valve supported by said frame for dispensing the fluid of said supply tank upon receiving the tail end of the tube of said aircraft unit, and a launching member slidable on said frame between retracted and extended positions for overcoming frictional retaining forces and to disengage said aircraft from said launching device and imparting a forward motion to said aircraft when the tail portion of the tube of said aircraft is received by said control valve; the control valve of said charging device comprising an orifice adapted to periodically receive and frictionally retain the tail end of the tube of said aircraft unit, a seat surrounding the orifice, and a ball normally engaging the seat by action of the fluid pressure of said supply tank to close said valve; the tail end of the tube of said aircraft when received in the orifice of said valve automatically opening said valve by displacing said ball and allowing the delivery of a charge of liquid carbon dioxide under pressure to the tank body of said aircraft; the ball of said valve assumming its seated position upon the launching of said aircraft; the supply tank of said charging and launching device being adapted for periodically recharging the tank body of said aircraft.

2. A jet propulsion apparatus comprising a main body having a charge receiving cavity of constant volume, a charging and discharging tube having a front end communicating with the interior of said cavity and a second end extending outwardly of said main body, a charging device frictionally receiving said second end of said tube for charging said cavity with a propulsion fluid under pressure, a launching member slidably supported upon said charging device for reciprocating longitudinal movement between retracted and extended positions, said launching member in said retracted position accommodating frictional engagement of said charging device and second end of said tube for charging said cavity, and said launching member being displaced toward said extended position to release said main body from said launching member and to release said second end of said tube from said charging device to vent said second end of said tube to the atmosphere.

3. A jet propulsion apparatus comprising a propelled body with a cavity adapted to receive a fluid charge of a volatile liquid under pressure, and a tube with a first end communicating with the cavity of said body for charging said cavity with said fluid, and a second extending end; said tube discharging said fluid in its gaseous state to produce a jet reaction; and a charging device having an orifice, a valve member normally closing said orifice, said orifice slidably receiving and frictionally retaining said second end of said tube in assembly with said charging device, said second end of said tube displacing said valve member in said assembled position with said charging device to provide communication between said cavity and said charging device, and an axially displaceable launching member slidably supported upon said charging device in positive driving engagement with said propelled body for separating said second end of said tube from said charging device to vent said second end of said tube to the atmosphere.

4. A jet propulsion apparatus comprising a propelled unit with a tank body having a front end, a rear end, a cavity of constant volume adapted to receive a fluid charge of a volatile liquid under pressure, and a charging and discharging tube having a forward portion entering the cavity of said body at its rear end and a second extending portion of predetermined length for engaging the control valve of a charging device provided with a metering orifice for discharging at a controlled rate the gaseous phase of said fluid of said cavity to produce a jet reaction; and a charging device comprising a supply tank having a cavity of constant volume containing a volatile liquid under pressure and a dispensing outlet, a control valve having an opening for dispensing fluid from said supply tank, a closure member for closing said valve opening, said closure member normally being urged toward closing engagement with said valve opening to block the escape of pressurized fluid from said tank, said valve member slidably receiving and frictionally retaining said second extending portion of said tube, said second extending portion of said tube within said valve member displacing said closure member to provide communication between said tank and said cavity, and an axially displaceable launching member slidably supported upon said charging device in positive driving engagement with said propelled body for separating said tube from said charging device to vent said metering orifice to the atmosphere.

5. A jet propulsion apparatus comprising, in combination, a propelled unit having a front end and a rear end, a pressurized fluid storage cavity within said unit, a tube communicating with said cavity and said rear end of said unit, a combined pressure fluid supply and launching device comprising a frame, a pressurized fluid supply tank replaceably mounted upon said frame, a control valve carried by said frame having a cavity at one end slidably receiving and frictionally retaining said rear end of said propelled unit in sealed engagement therewithin, duct means responsive to the presence of said rear end of said propelled unit within said cavity normally providing communication between said tank and said rear end of said propelled unit, said duct means having closure means movable into a duct closing position in response to displacement of said rear end of said propelled unit out of said cavity, and an axially displaceable launching member carried by said frame movable into positive linear driving engagement with said propelled unit to move said rear end out of said sealed engagement with said cavity to effect positive venting of said rear end of said propelled unit to the atmosphere.

References Cited in the file of this patent

UNITED STATES PATENTS

| | | |
|---|---|---|
| 2,498,596 | Wallach | Feb. 21, 1950 |
| 2,504,525 | Holderness | Apr. 18, 1950 |
| 2,537,358 | Lincoln | Jan. 9, 1951 |
| 2,545,586 | Pollak | Mar. 20, 1951 |
| 2,594,627 | Endicott | Apr. 29, 1952 |
| 2,723,656 | Andina | Nov. 15, 1955 |
| 2,732,657 | Krautkramer | Jan. 31, 1956 |
| 2,733,699 | Krinsky | Feb. 7, 1956 |
| 2,750,071 | Ritchie | June 12, 1956 |
| 2,767,701 | Schwartz et al. | Oct. 23, 1956 |

FOREIGN PATENTS

| | | |
|---|---|---|
| 161,579 | Australia | Mar. 1, 1955 |